United States Patent
Connors et al.

(12)
(10) Patent No.: US 6,862,835 B1
(45) Date of Patent: Mar. 8, 2005

(54) FISHING ROD HOLDER

(76) Inventors: Norman Joseph Connors, 6730 Springhill Rd., Belgrade, MT (US) 59714; John William Connors, 409 Henry Dr., Belgrade, MT (US) 59714

(*) Notice: Subject to any disclaimer, the term of this patent is extended or adjusted under 35 U.S.C. 154(b) by 0 days.

(21) Appl. No.: 10/144,311

(22) Filed: May 13, 2002

(51) Int. Cl.[7] ............................................. A01K 97/10
(52) U.S. Cl. ..................................................... 43/21.2
(58) Field of Search ........................... 43/21.2; 248/534, 248/535, 538; D22/147, 148; 211/70.8

(56) References Cited

U.S. PATENT DOCUMENTS

| | | | | |
|---|---|---|---|---|
| 2,785,494 A | * | 3/1957 | Eaton | 43/17 |
| 2,852,218 A | * | 9/1958 | Stires | 248/534 |
| 2,973,929 A | * | 3/1961 | Zawadzki | 248/534 |
| 3,147,563 A | * | 9/1964 | Molter | 43/17 |
| 3,628,759 A | * | 12/1971 | Knedlik | 248/534 |
| 4,161,839 A | * | 7/1979 | Ward | 43/21.2 |
| D332,299 S | * | 1/1993 | Dryna et al. | D22/147 |
| D359,793 S | * | 6/1995 | Medlin, Jr. et al. | D22/147 |
| 5,697,183 A | * | 12/1997 | Walker | 43/21.2 |
| 5,845,427 A | * | 12/1998 | Taylor | 42/94 |
| D462,107 S | * | 8/2002 | Robertson | D22/147 |

* cited by examiner

*Primary Examiner*—Kurt Rowan

(57) ABSTRACT

A fishing rod holder for a multitude of fishing rods and reels, which may be either, mounted on an aquatic vessel, a secure base on the land, or on a frozen body of water. The holder includes a base that receives two detachable upright supports. These supports have provisions to accept a formable wire that is secured to said rods and reels.

2 Claims, 2 Drawing Sheets

FISHING ROD HOLDER

FEDERALLY SPONSORED RESEARCH

Not Applicable

SEQUENCE LISTING OR PROGRAM

Not Applicable

BACKGROUND—FIELD OF INVENTION

This invention dates to fishing, specifically an improved fishing rod holder.

BACKGROUND—DESCRIPTION OF PRIOR ART

To understand the design of a fishing rod holder one must have a knowledge of how fish react when the bait is presented to them. They will inhale the bait and taste it to determine if it is what they want At this point they will either spit it out or swallow it This is where a good fishing rod holder is necessary. It must be able to indicate to the fisherman the instant the bait enters the fish's mouth. If the fish feels any resistance from the bait it will spit it out. Some fish will only move the bait a short distance so a sensitive rod holder is required.

Very few of the prior art patents offer this sensitivity. Most of them hold the rod in a fixed position (U.S. Pat. No. 5,184,797 Hurner Feb. 9, 1993 see attached patent). Some offer a balanced rod but are limited to a special design or only one style of rod (U.S. Pat. No. 2,650,052 Bintz Aug. 25, 1951, U.S. Pat. No. 3,824,730 Johnson Jul. 23, 1974, U.S. Pat. No. 4,161,839 Ward Jul. 24, 1979, U.S. Pat. No. 4,837,965 True Jun. 13, 1989, U.S. Pat. No. 5,987,801 Anderson Nov. 23, 1999 see attached patents).

Our invention not only offers the ability to balance the rod thereby indicating the slightest bite, but is also adaptable to numerous rod and reels. Also this balancing feature allows the wind to rock the rod thereby giving added movement to the bait.

Most of the prior art patents contain numerous parts because of their design. Our invention is injection molded thereby combining several parts, which assemble and disassemble easily without tools. The material used in the manufacturing process, with the exception of the formable wire is not susceptible to corrosion and has a lighter specific gravity than water thereby allowing the rod holder to float making recovery possible if it falls into the water.

SUMMARY

In a with the present invention a fishing rod holder comprising of a formable wire, two vertical uprights, and a base.

DESCRIPTION OF PREFERRED EMBODIMENT

Figure 1:
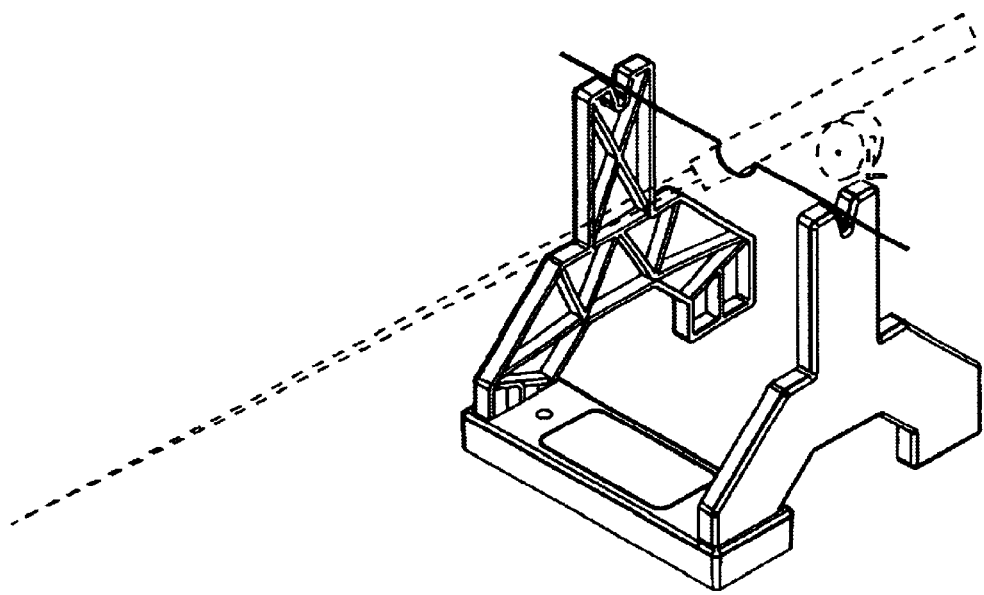
FIG. 1 is a perspective view showing the assembled components and a typical fishing rod (Shown by dotted lines) in the normal balance fishing position.
Figure 2:
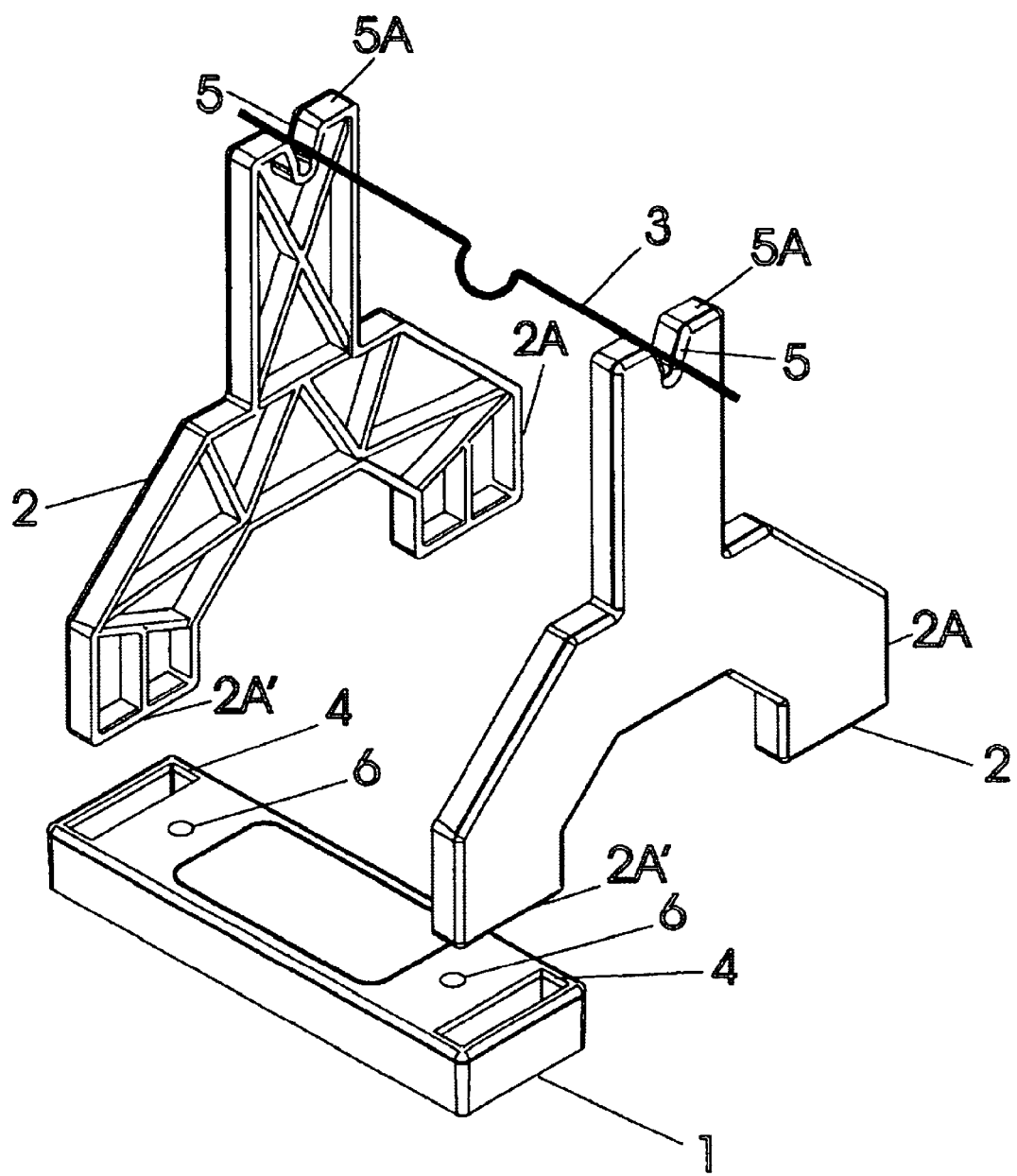
FIG. 2 is an exploded perspective view showing the various parts of the invention.

Referring to the drawings, there is disclosed a water floatable fishing rod holder, preferably formed of an injected molded material, comprising a pair of spaced apart, inverted 'Y' configured upright members 2, and a horizontally disposed base support 1. The upright members each consist of an upwardly extending arm, with a free end 5A having a notch 5, and first and second downwardly extending arms 2A, 2A', where a respective said first arm 2A is received within a corresponding recess or hole 4, as noted below, so that the rod holder is free standing.

The assembly is achieved by inserting the two vertical uprights 2 into the two rectangular holes 4 of the base 1.

The formable wire 3 is then snapped onto a typical fishing rod at the balance point of the fishing rod. The formable wire 3 may be adjusted if necessary to fit snugly on the fishing rod handle.

The fishing rod with the attached formable wire 3 is then placed in the notches 5 of the vertical uprights 2 centering the fishing rod between the vertical uprights 2 allowing the fishing rod to pivot freely.

The assembled invention may then be fastened to a secure surface by passing a variety of fasteners, depending on the composition of the secure surface through the two holes 6 in the base 1.

What is claimed is:

1. A water floatable fishing rod holder adapted to be removably secured to a multitude of fishing rods and reels, said fishing rod holder comprising:

a.) a pair of spaced apart, inverted "Y" configured, vertical upright members with upwardly extending free arms, each said free arm terminating in a free end, and said vertical upright members including first and second downwardly extending arms;

b.) a horizontally disposed support base for engagement with said upright members, where said support base includes a pair of spaced apart recesses each for receiving a first said downwardly extending arm, and means for securing said fishing rod holder to a supporting surface; and, c.) a formable wire adapted to extend between said free ends, where said formable wire at a midpoint is formed for snap engagement with said fishing rods and reels.

2. The water floatable fishing rod holder according to claim 1, wherein said free ends are provided with notches for seating said formable wire.

* * * * *